US008502832B2

(12) United States Patent
Buchner et al.

(10) Patent No.: US 8,502,832 B2
(45) Date of Patent: Aug. 6, 2013

(54) FLOATING POINT TEXTURE FILTERING USING UNSIGNED LINEAR INTERPOLATORS AND BLOCK NORMALIZATIONS

(75) Inventors: Brian A. Buchner, Oviedo, FL (US); Anthony P. DeLaurier, Los Gatos, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1028 days.

(21) Appl. No.: 12/130,364

(22) Filed: May 30, 2008

(65) Prior Publication Data
US 2009/0295819 A1    Dec. 3, 2009

(51) Int. Cl.
G09G 5/00    (2006.01)
G09G 5/02    (2006.01)
G09G 5/10    (2006.01)

(52) U.S. Cl.
USPC ........... 345/581; 345/582; 345/586; 345/589; 345/606; 345/609; 345/643

(58) Field of Classification Search
USPC ................. 345/606, 609, 643, 581, 582, 586, 345/589
See application file for complete search history.

(56) References Cited

U.S. PATENT DOCUMENTS

| 5,218,680 | A | | 6/1993 | Farrell et al. |
| 5,224,208 | A | * | 6/1993 | Miller et al. ................... 345/609 |
| 6,021,511 | A | | 2/2000 | Nakano |
| 6,104,415 | A | * | 8/2000 | Gossett ......................... 345/552 |
| 6,532,012 | B2 | | 3/2003 | Deering |
| 6,731,303 | B1 | | 5/2004 | Marino |
| 6,897,871 | B1 | | 5/2005 | Morein et al. |
| 7,073,088 | B2 | | 7/2006 | Jo |
| 7,081,894 | B1 | | 7/2006 | Oka et al. |

(Continued)

FOREIGN PATENT DOCUMENTS

| CN | 1183154 A | 5/1998 |
| CN | 1329329 A | 1/2002 |

(Continued)

OTHER PUBLICATIONS

International Search Report and Written Opinion for International Application No. PCT/US2009/03316, mailed Jul. 17, 2009.

(Continued)

*Primary Examiner* — Jeffrey Chow
(74) *Attorney, Agent, or Firm* — Sterne, Kessler, Goldstein & Fox P.L.L.C.

(57) ABSTRACT

Apparatus and systems utilizing fixed point filtering to perform floating point texture filtering. A texture pipe unit consisting of a texture addressing unit, texture cache unit, and texture filter unit accepts texture requests for a specified pixel from a resource and returns formatted bilinear filtered results based on the specific pixel's corresponding four texels. The texture filtering unit consists of a pre-formatter module, interpolator module, accumulator module and a format module. The pre-formatter module accepts texel data in a floating point or fixed point format. However, if the data is in a floating point format the pre-formatter module converts the floating point data into a normalized fixed point data format whereby the interpolator module may perform its bilinear interpolator functions using standardized fixed point systems and apparatus without necessitating the use of floating point arithmetic units. A method utilizing fixed point filtering to perform floating point texture filtering is also presented.

20 Claims, 5 Drawing Sheets

U.S. PATENT DOCUMENTS

| | | | |
|---|---|---|---|
| 7,110,006 | B2 | 9/2006 | MacInnis et al. |
| 7,136,068 | B1 | 11/2006 | Priem et al. |
| 7,164,426 | B1 | 1/2007 | Duluk, Jr. et al. |
| 7,280,107 | B2 | 10/2007 | Whitted et al. |
| 7,330,188 | B1 | 2/2008 | Solanki et al. |
| 7,352,374 | B2 | 4/2008 | Brown Elliott et al. |
| 7,936,359 | B2 * | 5/2011 | Spangler et al. ............... 345/606 |
| 2004/0189652 | A1 | 9/2004 | Emberling |
| 2006/0028482 | A1 * | 2/2006 | Donovan et al. ............. 345/586 |
| 2006/0053188 | A1 | 3/2006 | Mantor et al. |
| 2006/0093044 | A1 | 5/2006 | Grantham et al. |
| 2006/0101307 | A1 | 5/2006 | Rapp et al. |
| 2006/0250409 | A1 | 11/2006 | Bando et al. |
| 2007/0011434 | A1 | 1/2007 | Luick |
| 2007/0211070 | A1 | 9/2007 | Stenson |
| 2008/0094405 | A1 | 4/2008 | Bastos et al. |
| 2008/0094407 | A1 | 4/2008 | Xu et al. |
| 2008/0094408 | A1 | 4/2008 | Yin et al. |
| 2008/0284786 | A1 * | 11/2008 | Airey et al. ................... 345/545 |
| 2009/0295821 | A1 | 12/2009 | Mantor et al. |
| 2009/0309896 | A1 | 12/2009 | DeLaurier et al. |
| 2009/0315909 | A1 | 12/2009 | DeLaurier et al. |

FOREIGN PATENT DOCUMENTS

| | | | |
|---|---|---|---|
| CN | 1423198 | A | 6/2003 |
| CN | 1942922 | A | 4/2007 |
| CN | 101189601 | A | 5/2008 |

OTHER PUBLICATIONS

International Search Report and Written Opinion for International Application No. PCT/US2009/03317, mailed Jul. 17, 2009.

Office Action mailed Mar. 26, 2012 in U.S. Appl. No. 12/476,152, DeLaurier, A. et al., filed Jun. 1, 2009, Non-Final Rejection mailed Ju. 4, 2012 for U.S. Appl. No. 12/476,161, filed Jun. 1, 2009; 17 pages.

Non-Final Rejection mailed Jun. 13, 2012 for U.S. Appl. No. 12/476,202, filed Jun. 1, 2009; 23 pages.

Office action mailed Jul. 23, 2012, in U.S. Appl. No. 12/476,152, DeLaurier, A.P. et al., filed Jun. 1, 2009.

Office action mailed Oct. 10, 2012, in U.S. Appl. No. 12/476,161, Mantor, M.J. et al., filed Jun. 1, 2009.

First Office Action (with English-Language Translation) directed to Chinese Patent Application No. 200980119971.5, mailed Oct. 8, 2012; 25 pages.

First Office Action (with English-Language Translation) directed to Chinese Patent Application No. 200980119829.0, mailed Oct. 9, 2012; 24 pages.

Search Report and Written Opinion for International Application No. PCT/US09/03314 mailed Jul. 23, 2009, 7 pages.

* cited by examiner

FLOATING POINT TEXTURE FILTERING USING UNSIGNED LINEAR INTERPOLATORS AND BLOCK NORMALIZATIONS

BACKGROUND

1. Field of the Invention

The present invention is generally directed to computing operations performed in computing systems, and more particularly directed to graphics processing tasks performed in computing systems.

2. Related Art

A graphics processing unit (GPU) is a complex integrated circuit that is specially designed to perform graphics processing tasks. A GPU may, for example, execute graphics processing tasks required by an end-user application, such as a video game application. In such an example, there are several layers of software between the end-user application and the GPU.

The end-user application communicates with an application programming interface (API). An API allows the end-user application to output graphics data and commands in a standardized format, rather than in a format that is dependent on the GPU. Several types of APIs are commercially available, including Direct® developed by Microsoft Corp. and OpenGL® developed by Silicon Graphics, Inc. The API communicates with a driver. The driver translates standard code received from the API into a native format of instructions understood by the GPU. The driver is typically written by the manufacturer of the GPU. The GPU then executes the instructions from the driver.

Typically, GPUs also support a concept known as texture filtering. Texture filtering is a method used to determine the texture color for a texture mapped pixel through the use of the colors of nearby pixels of the texture, or texels. The process is also referred to as texture smoothing or texture interpolation. However, high image quality texture filtering requires a high degree of computational complexity.

As an aid to reduce the amount of data needed during texture filtering, a concept of mip mapping is used whereby multiple bitmap versions of the image are stored, each version being encoded and stored at a reduced level of detail. In this manner, as the view of the image is minimized, such as moving away from the image, the displayed image is a version with a reduced level of detail. Because of this reduction in detail, texture filtering can be calculated on a version of the image with a reduced level of detail thereby not increasing the required level of computation as an image is minimized.

The simplest form of texture filtering is referred to as nearest neighbor interpolation which simply returns the color of the texel closest to the center of the requested pixel. While this method requires minimal computation, it also results in a large amounts of "blockiness" during magnification as well as aliasing and shimmering during any type of minification. Nearest neighbor interpolation can also be used with mip mapping, using the nearest mip map level according to the distance from the image. This approach aids in the reduction of aliasing and shimmering, but does not solve blockiness.

In order to solve some of these problems, a bilinear filtering concept is employed whereby instead of relying upon a single texel, the four nearest texels to the pixel in question are sampled and the colors of each texel are combined by a weighted average according to distance. This technique results in a smoothing gradient of color change from one texel to the next, instead of a sudden change when a pixel center crosses a texel boundary.

However, where the rendering of an image changes from one mip map level to another there tends to be a very noticeable change in the quality at the boundaries between the levels which is not solved using bilinear filtering. In this situation the concept of trilinear filtering is used which involves doing a texture lookup and bilinear filtering on the two closest mip map levels, and then performing a linear interpolation of the results. This results in a smooth degradation of texture quality as distance from the viewer increases, rather than a series of steps.

Anisotropic filtering is typically the highest quality filtering available in consumer based three dimensional graphics cards. Bilinear and trilinear filtering results are correct only when the viewer is looking at the texture perpendicularly. Under these techniques an object will appear blurry when the textured surface is at an oblique angle. Anisotropic filtering corrects this error by sampling in the correct trapezoid shape according to the viewing angle and then trilinearly filtering the results.

While the more sophisticated bilinear, trilinear, and anisotropic filtering techniques produce better results they require higher amounts of computation. In addition, where the dynamic range of sampled texels is large, the required computations typically are done using floating point arithmetic solutions in order to preserve data quality. Floating point calculations require the use of floating point arithmetic logic units within a GPU which increases the associated cost and area required in a circuit to implement.

What are needed, therefore, are systems and/or methods to alleviate the aforementioned deficiencies. Particularly, what is needed is a quality, efficient and cost effective approach to perform bilinear, trilinear, and anisotropic filtering without the need for floating point arithmetic calculations and the associated floating point arithmetic units.

BRIEF SUMMARY

Consistent with the principles of the present invention as embodied and broadly described herein, the present invention includes a texture filter system comprising a pre-formatter module, an interpolator module, an accumulator module, and a format module. The pre-formatter module is configured to receive texel data and convert it to a normalized fixed point format. The interpolator module is configured to perform an interpolation on the normalized fixed point texel data from the pre-formatter module and generate re-normalized floating point texel data. The accumulator module is configured to accumulate floating point texel data from the interpolator module to achieve the desired level of bilinear, trilinear, and anisotropic filtering. The format module is configured to convert texel data from the accumulator module into a standard floating point representation.

In an embodiment of the invention, the pre-formatter module is configured to receive texel data in a floating point format. In this embodiment the pre-formatter module analyzes the data for exponent deltas and performs a block normalization on the incoming floating point data in order to generate a set of fixed point texel data relative to a common, largest, exponent. The interpolator module is configured to perform one or more interpolations utilizing fixed point calculations from which the results are accumulated in the accumulator module. The format module is configured to convert the accumulated texel data in the accumulator module into a standard floating point representation.

In another embodiment the pre-formatter module is configured to receive texel data in a fixed point format. The interpolator module is configured to perform one or more interpolations utilizing fixed point calculations from which the results are accumulated in the accumulator module. The format module is configured to convert the accumulated texel data in the accumulator module into a standard floating point representation.

In yet another embodiment the pre-formatter module is configured to receive texel data in a signed or unsigned format.

Further embodiments, features, and advantages of the invention, as well as the structure and operation of the various embodiments of the invention are described in detail below with reference to accompanying drawings.

BRIEF DESCRIPTION OF THE FIGURES

The accompanying drawings, which are incorporated in and constitute part of the specification, illustrate embodiments of the invention and, together with the general description given above and the detailed description of the embodiment given below, serve to explain the principles of the present invention. In the drawings.

DETAILED DESCRIPTION

The present invention relates to a texture filter with the ability to receive texel data in multiple formats, including floating point and fixed point, in a signed or unsigned format. In embodiments of this invention, floating point texel data is converted and normalized into a fixed point format. Once the texel data is in a fixed point format then the interpolations can be preformed using fixed point data calculations. In this manner the implementation of the functionality within the interpolator module does not necessitate the use of floating point arithmetic logic. After the interpolations are accumulated in the accumulator module the format module converts the texel data into a standard floating point representation.

While specific configurations, arrangements, and steps are discussed, it should be understood that this is done for illustrative purposes only. A person skilled in the pertinent art(s) will recognize that other configurations, arrangements, and steps may be used without departing from the spirit and scope of the present invention. It will be apparent to a person skilled in the pertinent art(s) that this invention may also be employed in a variety of other applications.

It is noted that references in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of one skilled in the art to incorporate such a feature, structure, or characteristic in connection with other embodiments whether or not explicitly described.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
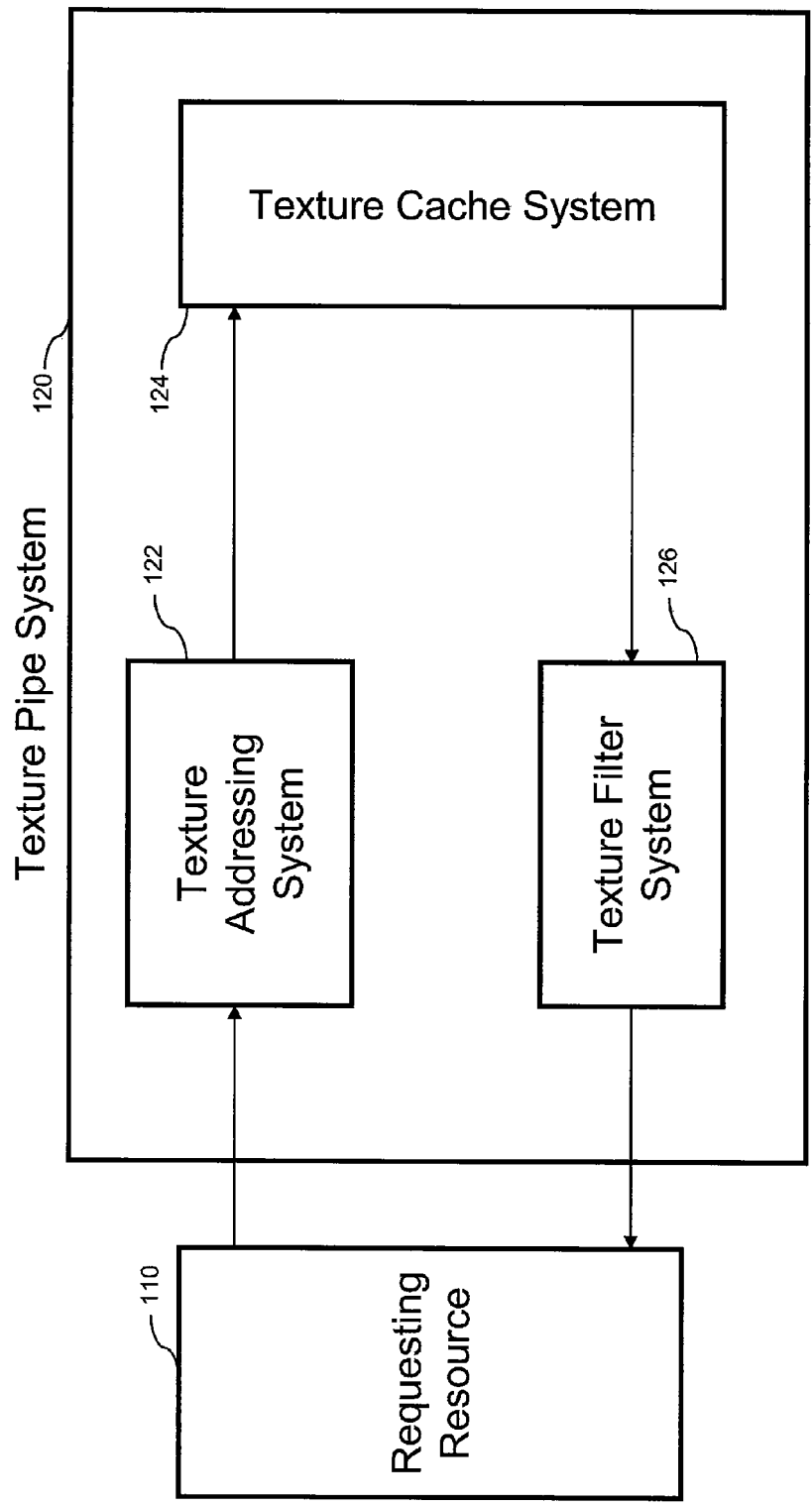
FIG. 1 is a system diagram depicting an implementation of a texture pipe system according to an embodiment of the present invention.

FIG. 1 is an illustration of a system 100 where a requesting resource 110 generates a texture request to a texture pipe system 120. Texture pipe system 120 comprises a texture addressing system 122, a texture cache system 124, and a texture filter system 126. Once a requesting resource 110 issues a texture request to texture pipe system 120, the texture addressing system 122 within the texture pipe system 120 generates appropriate addresses required for a single bilinear texture operation. These addresses are applied to texture cache system 124 which contains texel data associated with each pixel. Texture cache system 124 then presents the texel data associated with the requested pixel to texture filter system 126 which is the focus of this invention.

Figure 2:
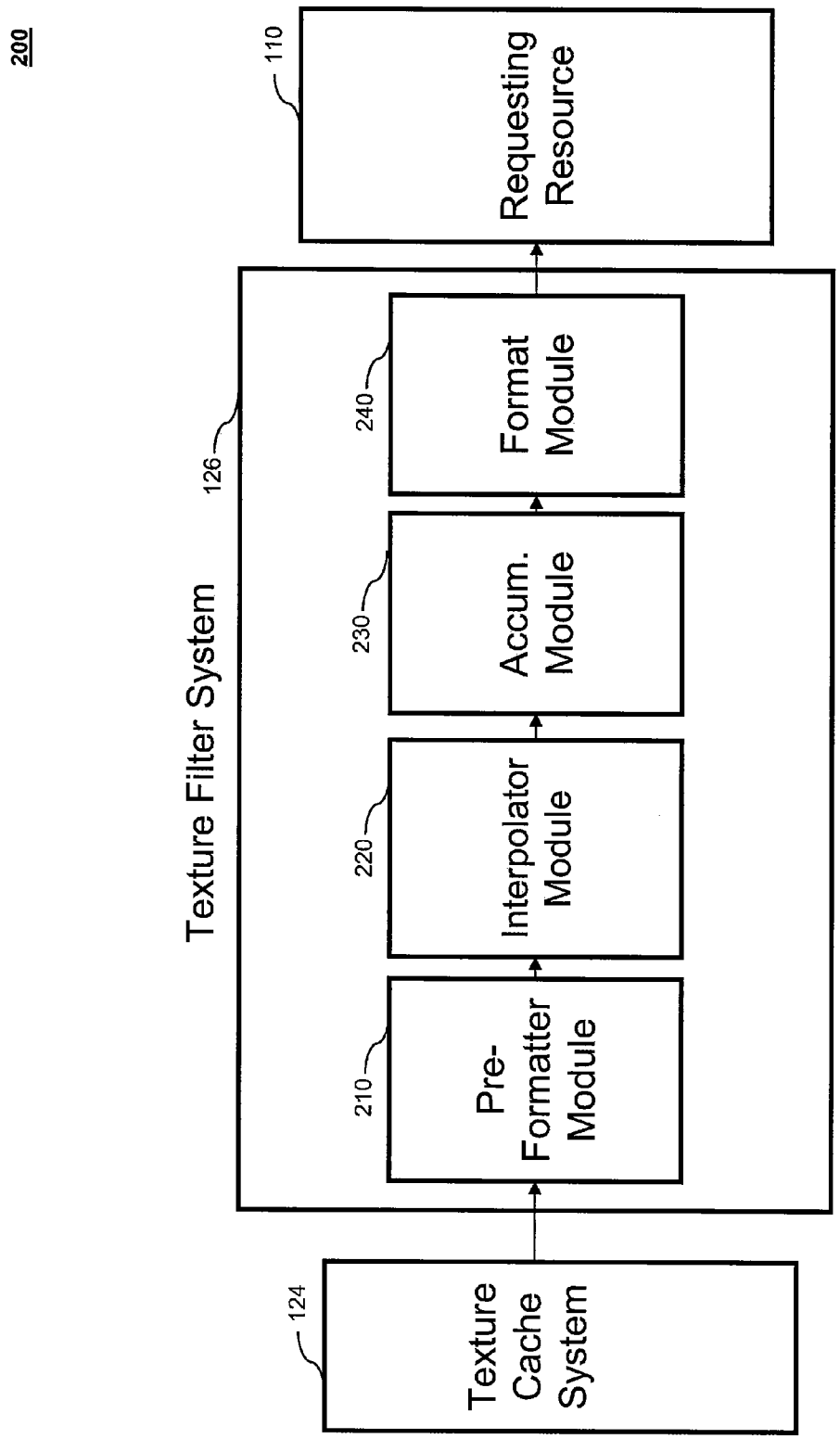
FIG. 2 is a system diagram depicting an implementation of a texture filter system according to an embodiment of the present invention.

The system of FIG. 2 illustrates the components comprising the texture filter system 126 according to an embodiment of the present invention. Texture filter system 126 receives texel data from texture cache system 124 and, after the data is processed, presents the texel data back to the requesting resource 110. Texture filter system 126 comprises a pre-formatter module 210, an interpolator module 220, an accumulator module 230, and a format module 240. Pre-formatter module 210 is configured to receive texel data and performs a block normalization thereby generating normalized fixed point texel data. Interpolator module 220 receives the normalized fixed point texel data and performs one or more interpolations, each of which are accumulated in accumulator module 230, to achieve the desired level of bilinear, trilinear, and anisotropic texture filtering. Format module 240 converts the accumulated texel data from accumulator module 230 to a standard floating point representation for the requesting resource 110.

Figure 3:
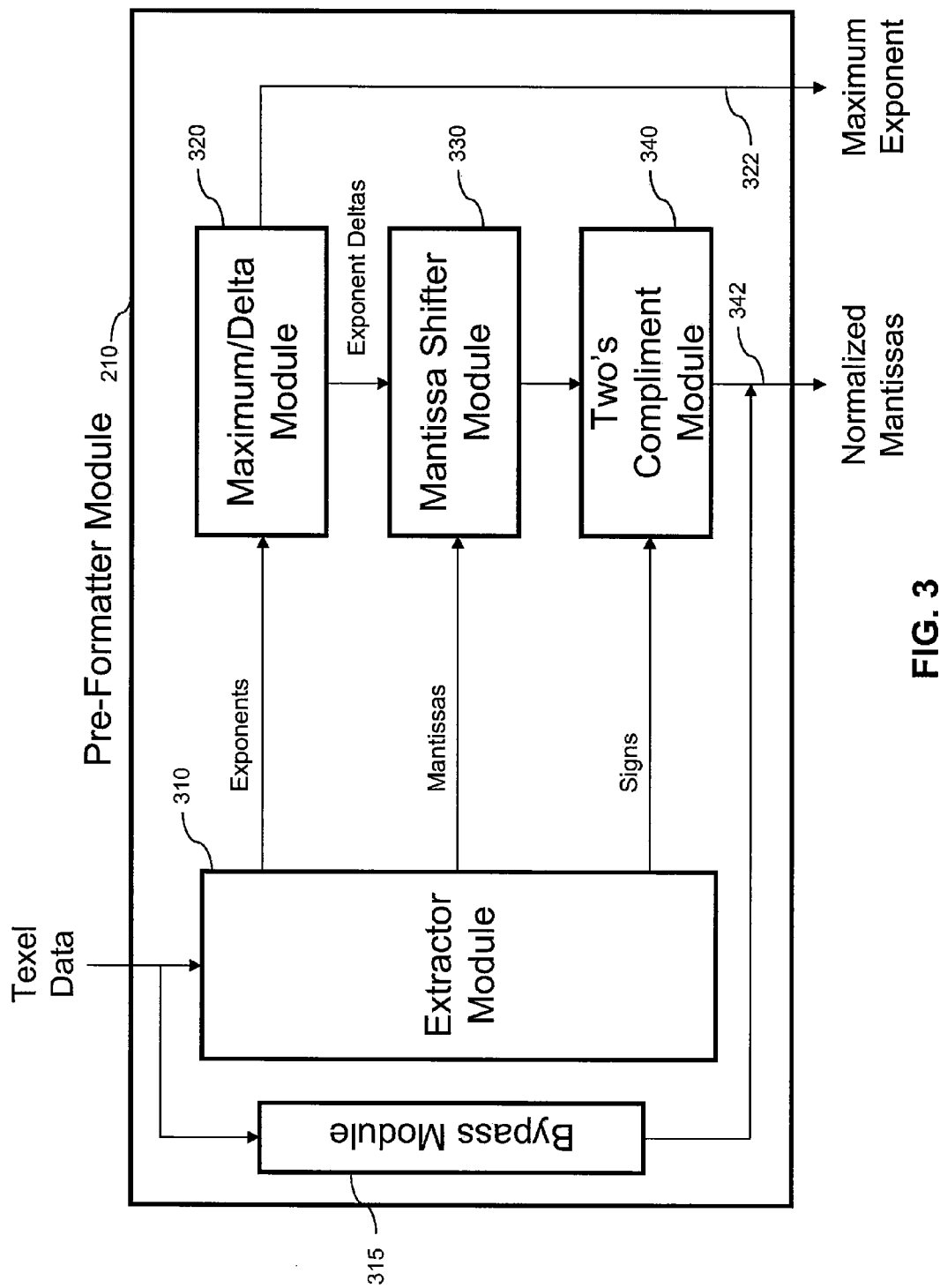
FIG. 3 is a system diagram depicting an implementation of a pre-formatter module within a texture filter system according to an embodiment of the present invention.

FIG. 3 illustrates the components that comprise pre-formatter module 210 within texture filter system 126 according to an embodiment of the present invention. Pre-formatter module 210 is configured to receive texel data in a floating point or fixed point format. In addition, texel data may be signed or unsigned. However, pre-formatter module 210 treats floating point texel format data differently than fixed point texel format data. Symbolically, floating point data can be represented as $(m \cdot b^e)$ where m is the mantissa, b is the base of the number, and e is the exponent. In the case of fixed point data there are a certain number of digits after, and/or before the decimal point, but there is no base value or exponent value. Therefore, fixed format texel data is multiplexed directly using bypass module 315 to normalized mantissas 342 output without further processing by extractor module 310, maximum/delta module 320, mantissa shifter module 330, and two's compliment module 340 In the case of a floating point texel, extractor module 310 will capture the mantissa value, the exponent value, and the sign of incoming texel data.

In one embodiment pre-formatter module 210 receives a block of texel data which is comprised of floating point texel data representing four texels. In this case where pre-formatter module 210 receives a block of floating point texel data, extractor module 310 will extract the mantissas, exponents, and signs associated with each texel. The exponents of the floating point texels are received by maximum/delta module 320. Maximum/delta module 320 provides two functions. First, within the block of floating point texels received by pre-formatter module 210, the maximum/delta module 320 identifies the exponent of maximum value (most positive). Secondly, maximum/delta module 320 calculates the difference between this maximum exponent and the exponent for each floating point texel value. Then, for each floating point texel mantissa, mantissa shifter module 330 normalizes the mantissa with respect to the exponent of maximum value. This normalization is accomplished by shifting the mantissa right by the number of bit positions equal to the respective (for that texel) exponent delta calculated by maximum/delta module 320. In addition, if a floating point texel mantissa is negative then two's compliment module 340 will convert the shifted negative floating point texel mantissa into an unsigned two's compliment value. In summary, pre-formatter module 210, in the case of receiving a block of floating point texel data, will generate a block of unsigned, normalized mantissa values 342 along with the corresponding maximum block exponent value 322.

Pre-formatter module 210 of FIG. 3 also identifies when an invalid texel value is encountered, including an infinity, undefined, and negative zero. In addition, pre-formatter module 210 will merge a hidden 1 into the mantissa for normalized floating point texel data that does not explicitly represent the leading 1.

Figure 4:
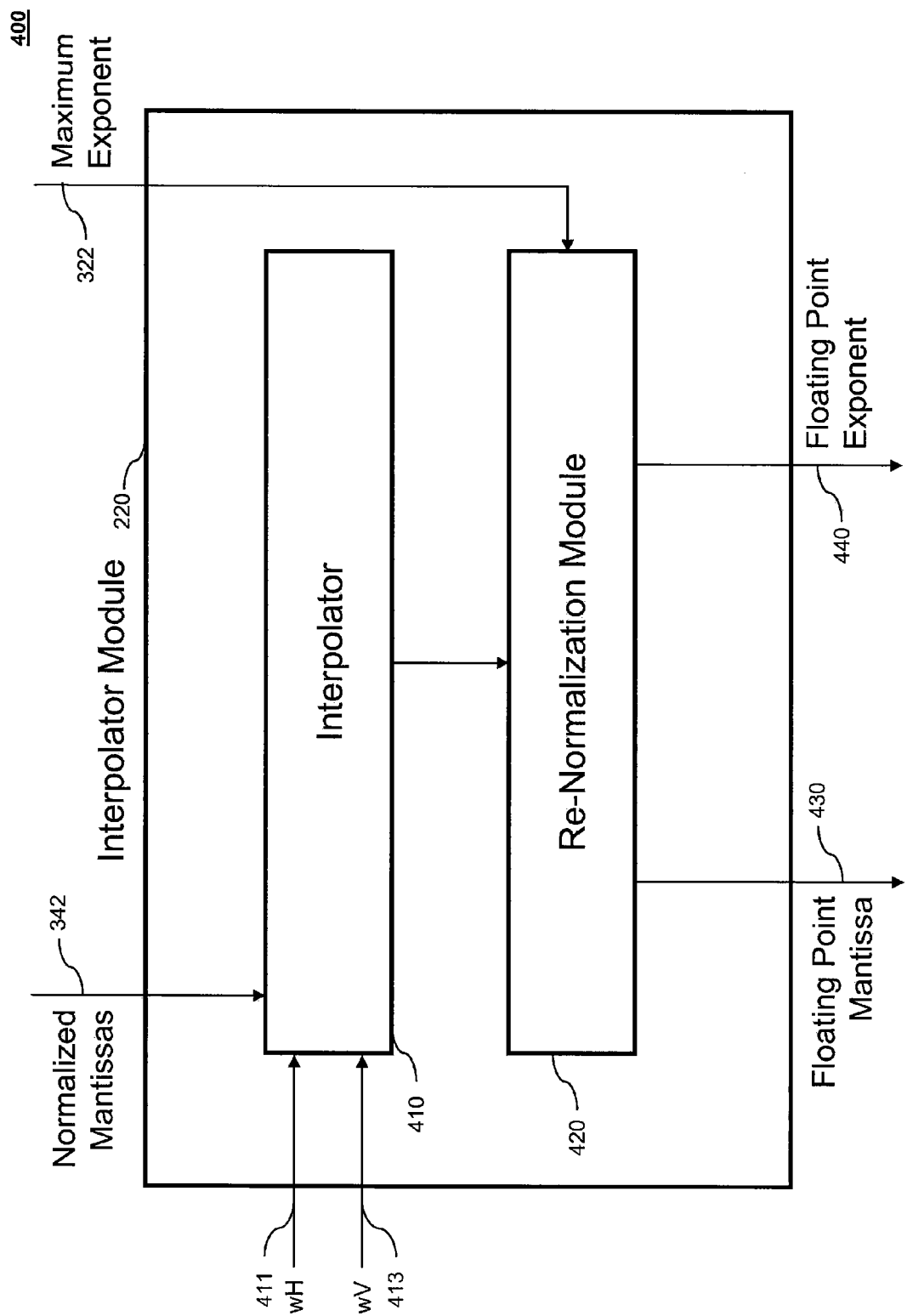
FIG. 4 is a system diagram depicting an implementation of a interpolator module within a texture filter system according to an embodiment of the present invention.

FIG. 4 illustrates the components that comprise interpolator module 220 within the texture filter system 126 according to an embodiment of the present invention. Since pre-formatter module 210 has converted the texel data into a fixed point format, interpolator module 220 does not have to accommodate floating point data while performing interpolations. As shown in FIG. 4, interpolator module 220 comprises a interpolator 410 and a re-normalization module 420. Interpolator module 220 receives normalized mantissas 342 and maximum exponent value 322 from pre-formatter module 210. Normalized mantissas 342 are used by interpolator 410 in performing an interpolation of the block of normalized mantissas using a weighted algorithm based on horizontal integer weight wH 411 input and vertical integer weight wV 413 input. The results of the interpolation are then sent to re-normalization module 420 which adjusts the maximum exponent value 322 to account for the number of bit positions required when renormalizing the interpolation result, thereby producing normalized floating point mantissa 430 with floating point exponent 440.

Interpolator module 220 of FIG. 4 is configured to perform multiple interpolations which may be necessary to achieve various levels of texture filtering including, but not limited to, bilinear, trilinear, and anisotropic. Accumulator module 230 accumulates the results of multiple interpolations in order to produce the desired level of filtering.

Format module 240 is configured to convert floating point texel data from the accumulator module 230 into a desired standard floating point format, such as the IEEE-Float 32 representation.

Figure 5:
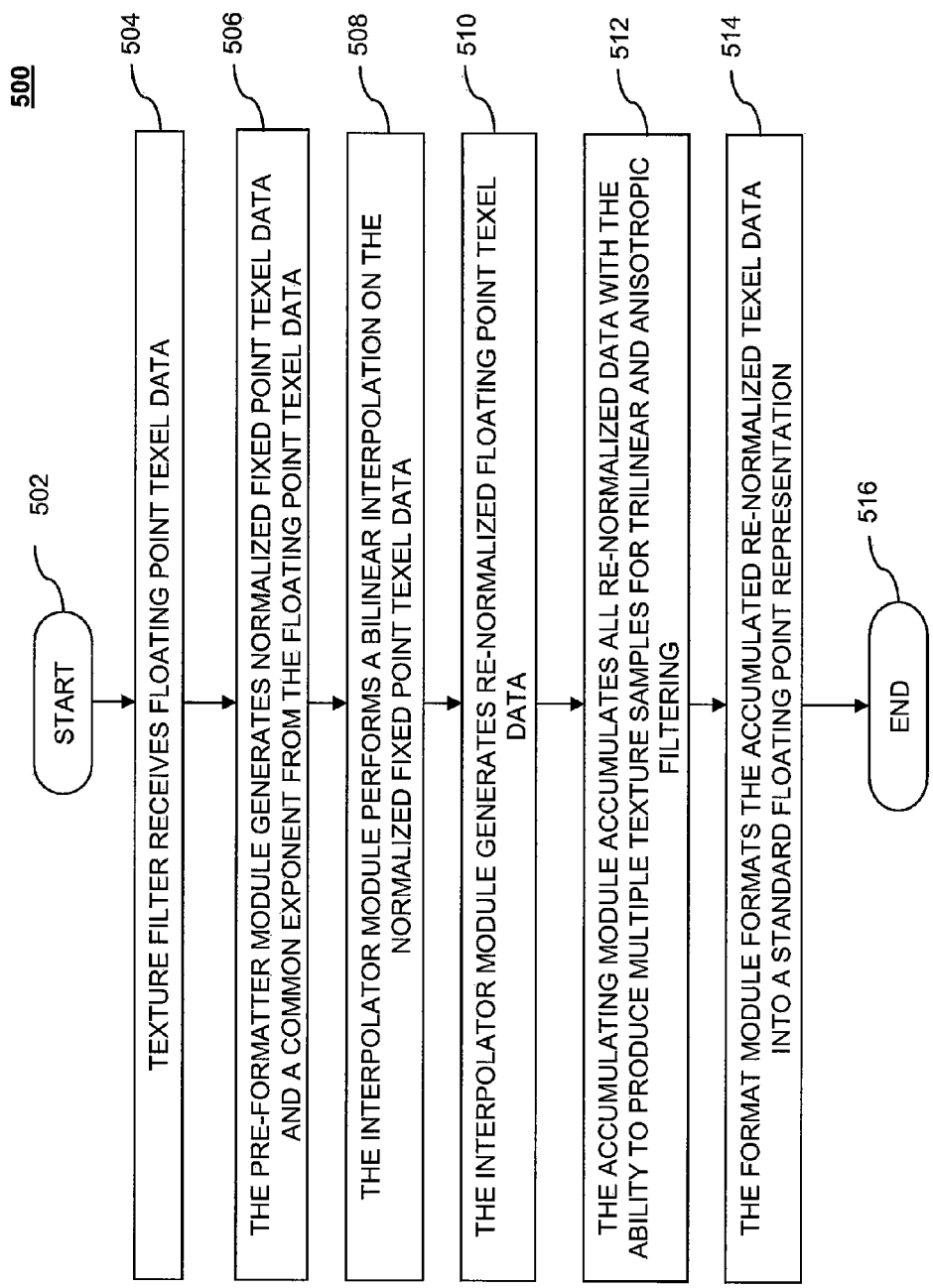
FIG. 5 is a flowchart depicting an implementation of a method for texture filtering according to an embodiment of the present invention.

FIG. 5 is a flowchart depicting a method 500 for floating point texture filtering using unsigned linear interpolators and block normalization. Method 500 begins at step 502. In step 504, a texture filter receives a block of floating point texel data as a result of a requesting resource issuing a texture request. In step 506, the pre-formatter module generates normalized fixed point texel data and a common, highest, exponent from the block of floating point texel data.

In step 508, the interpolator module performs interpolation operations on the normalized block of fixed point texel data. In step 510 the interpolator module generates re-normalized floating point texel data based from the interpolation operations and the maximum exponent identified in the pre-formatting process. In step 512, the accumulating module accumulates re-normalized data from the interpolator module with the ability to produce bilinear, trilinear, and anisotropic filter data. In step 514, the format module formats the accumulated re-normalized texel data into a standard floating point representation.

The functions, processes, systems, and methods outlined in FIGS. 1, 2, 3, 4, and 5 can be implemented in software, firmware, or hardware, or using any combination thereof. If programmable logic is used, such logic can execute on a commercially available processing platform or a special purpose device.

As would be apparent to one skilled in the relevant art, based on the description herein, embodiments of the present invention can be designed in software using a hardware description language (HDL) such as, for example, Verilog or VHDL. The HDL-design can model the behavior of an electronic system, where the design can be synthesized and ultimately fabricated into a hardware device. In addition, the HDL-design can be stored in a computer product and loaded into a computer system prior to hardware manufacture.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A texture filtering system, comprising:
   a hardware-based pre-formatter module configured to receive texel data and generate normalized fixed point texel data;
   a hardware-based interpolator module configured to perform an interpolation on the normalized fixed point texel data from the pre-formatter module and generate re-normalized floating point texel data;
   a hardware-based accumulator module configured to accumulate the floating point texel data from the interpolator module; and
   a hardware-based format module configured to convert the texel data from the accumulator module into a standard floating point representation.

2. The texture filtering system of claim 1, wherein the pre-formatter module is configured to receive the texel data in a signed format and an unsigned format.

3. The texture filtering system of claim 1, wherein the pre-formatter module is configured to receive the texel data in a floating point format and a fixed point format.

4. The texture filtering system of claim 1, wherein the interpolator module is configured to perform a bilinear interpolation.

5. The texture filtering system of claim 1, wherein the interpolator module is configured to perform one or more interpolations in order to produce at least one of:
   a bilinear texture filtering;
   a trilinear texture filtering; and
   an anisotropic texture filtering.

6. The texture filtering system of claim 1, wherein an operation of the pre-formatter module comprises:
   extracting a sign, an exponent, and a mantissa from each floating point texel in a block of floating point texel data;
   identifying if an infinity, undefined, and negative zero exist in each floating point texel in a block of floating point texel data;
   merging a hidden 1 into the mantissa for the normalized floating point texel data;
   two's complementing a negative mantissa; and
   applying a block normalization wherein (i) a largest exponent is identified and (ii) a delta is calculated between each exponent and the largest exponent, the mantissa being shifted right by the delta.

7. The texture filtering system of claim 6, wherein the block of floating point texel data represents four texels.

8. The texture filtering system of claim 1, wherein the interpolator module is configured to generate the re-normalized floating point texel through an operation comprising:
   performing an interpolation on the fixed point texel data using a horizontal weight and a vertical weight; and
   re-normalizing the fixed point texel data to the floating point texel data based on a largest exponent of the fixed point texel data from the pre-formatter module.

9. The filtering system of claim 8, wherein the interpolation is configured to be implemented as more than one linear interpolation.

10. A method for texture filtering, comprising:
    receiving, using a processor, floating point texel data;
    generating, using the processor, normalized fixed point texel data from the floating point texel data;
    performing using the processor, interpolation on the normalized fixed point texel data;
    generating, using the processor, re-normalized floating point texel data;
    accumulating, using the processor, the re-normalized floating point texel data; and
    formatting, using the processor, the accumulated re-normalized floating point texel data into a standard floating point representation.

11. The method for texture filtering of claim 10, wherein the generating the normalized fixed point texel data further comprises:
    extracting a sign, an exponent, and a mantissa from the floating point texel data;
    identifying if an infinity, undefined, and negative zero exist in the floating point texel data;
    merging a hidden 1 into the mantissa for the normalized floating point texel data;
    two's complementing a negative mantissa; and
    applying a block normalization wherein (i) a largest exponent is identified and (ii) a delta is calculated between each exponent and the largest exponent, the mantissa being shifted right by the delta.

12. The method for texture filtering of claim 10, wherein the interpolation further comprises:
    Performing the interpolation on the normalized fixed point texel data using a horizontal weight and a vertical weight; and
    re-normalizing the fixed point texel data to the floating point texel data.

13. The method for texture filtering of claim 10, wherein the interpolation further comprises:
    achieving a bilinear texture filter;
    achieving a trilinear texture filter; and
    achieving an anisotropic texture filter.

14. The method for texture filtering of claim 10, wherein the method is performed by synthesizing hardware description language instructions.

15. A system for texture filtering, comprising:
    a processor; and
    a memory in communication with said processor, said memory for storing a plurality of processing instructions for directing said processor to:
    receive floating point texel data;
    generate normalized fixed point texel data from the floating point texel data;
    perform interpolation on the normalized fixed point texel data;
    generate re-normalized floating point texel data;
    accumulate the re-normalized floating point texel data; and
    format the accumulated re-normalized floating point texel data into a standard floating point representation.

16. The texture filtering system of claim 15, wherein the processing instructions directing the processor to generate the normalized fixed point texel data further comprises processing instructions for directing said processor to perform:
    extracting a sign, an exponent, and a mantissa from the floating point texel data;
    identifying if an infinity, undefined, and negative zero exist in the floating point texel data;
    merging a hidden 1 into the mantissa for the normalized floating point texel data;
    two's complementing a negative mantissa; and
    applying a block normalization wherein (i) a largest exponent is identified and (ii) a delta is calculated between each exponent and the largest exponent, the mantissa being shifted right by the delta.

17. The texture filtering system of claim 15, wherein the processing instructions directing the processor to perform interpolation further comprises processing instructions for directing said processor to perform:

a interpolation on the fixed point texel data using a horizontal weight and a vertical weight; and re-normalizing the fixed point texel data to floating point texel data.

18. The texture filtering system of claim 15, wherein wherein the processing instructions directing the processor to perform interpolation further comprises processing instructions for directing said processor to perform:

producing a bilinear texture filter;
producing a trilinear texture filter; and
producing an anisotropic texture filter.

19. A non-transitory computer readable medium carrying one or more sequences of one or more instructions for execution by one or more processors to perform a method for texture filtering, comprising:

receiving floating point texel data;
generating normalized fixed point texel data from the floating point texel data;
performing interpolation on the normalized fixed point texel data;
generating re-normalized floating point texel data;
accumulating the re-normalized floating point texel data; and
formatting the accumulated re-normalized floating point texel data into a standard floating point representation.

20. The non-transitory computer readable medium method of claim 19, wherein the generating normalized fixed point texel data further comprises:

extracting a sign, an exponent, and a mantissa from the floating point texel data;
identifying if an infinity, undefined, and negative zero exist in the floating point texel data;
merging a hidden 1 into the mantissa for the normalized floating point texel data;
two's complementing a negative mantissa; and
applying a block normalization wherein (i) a largest exponent is identified and (ii) a delta is calculated between each exponent and the largest exponent, the mantissa being shifted right by the delta.

* * * * *

UNITED STATES PATENT AND TRADEMARK OFFICE
CERTIFICATE OF CORRECTION

PATENT NO. : 8,502,832 B2
APPLICATION NO. : 12/130364
DATED : August 6, 2013
INVENTOR(S) : Buchner et al.

It is certified that error appears in the above-identified patent and that said Letters Patent is hereby corrected as shown below:

In the Claims:

<u>Column 7</u>

Line 55 please replace "The filtering" with --The texture filtering--.

Signed and Sealed this
Nineteenth Day of November, 2013

Teresa Stanek Rea
*Deputy Director of the United States Patent and Trademark Office*